A. R. ZIMMERMAN.
SLED RUNNER FOR WHEELED VEHICLES.
APPLICATION FILED FEB. 8, 1916.
1,215,091. Patented Feb. 6, 1917.
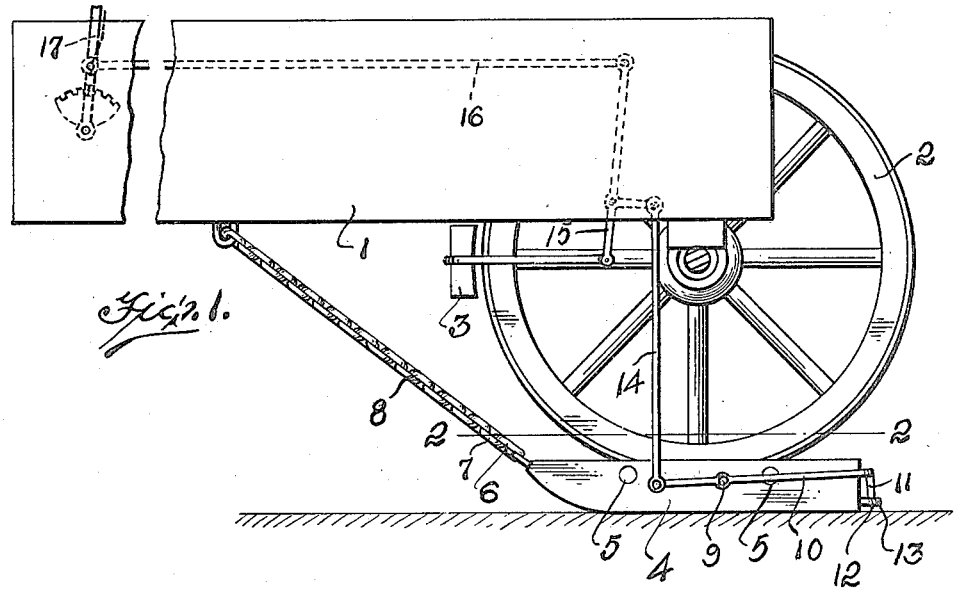
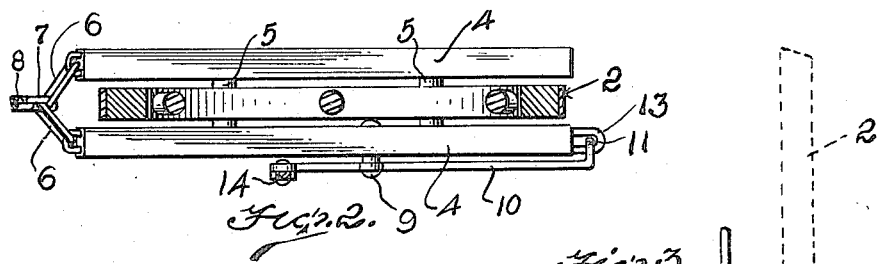
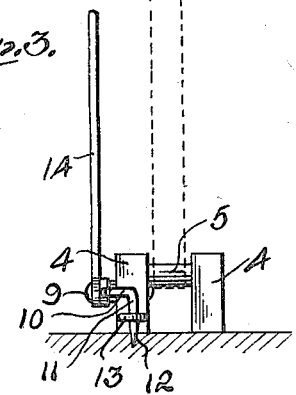
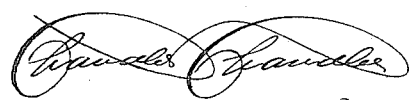

UNITED STATES PATENT OFFICE.

ARTHUR R. ZIMMERMAN, OF SHAMOKIN, PENNSYLVANIA.

SLED-RUNNER FOR WHEELED VEHICLES.

1,215,091. Specification of Letters Patent. Patented Feb. 6, 1917.

Application filed February 8, 1916. Serial No. 76,961.

*To all whom it may concern:*

Be it known that I, ARTHUR R. ZIMMERMAN, a citizen of the United States, residing at Shamokin, in the county of Northumberland, State of Pennsylvania, have invented certain new and useful Improvements in Sled-Runners for Wheeled Vehicles; and I do hereby declare the following to be a full, clear, and exact description of the invention, such as will enable others skilled in the art to which it appertains to make and use the same.

The present invention is directed to improvements in sled runner for wheeled vehicles, and has for its object to so construct a device of this character that the same can be easily and quickly attached to a wheeled vehicle and as readily detached therefrom.

A further object of the invention is to provide a runner of this character in which there is embodied a conveniently manipulable braking mechanism for retarding the progress of the vehicle.

With these and other objects in view, this invention resides in the novel features of construction, formation, combination and arrangement of parts to be hereinafter more fully described, claimed and illustrated in the accompanying drawing, in which—

Figure 1 is a fragmentary side elevation of a wagon, equipped with the device.

Fig. 2 is a sectional view on line 2—2 of Fig. 1.

Fig. 3 is a rear elevation of the device.

Fig. 4 is a plan view of a slightly modified form of the invention.

Referring to the drawing 1 indicates the body of a wagon, and 2 one of the rear wheels thereof, said body having mounted thereon the usual brake shoe 3 for use when there is no snow or ice.

The invention consists of a pair of runners 4, said runners being held in spaced parallel relation by rods 5, and upon which the rim of the wheel 2 is adapted to rest when the device is in use.

The forward ends of the runners are provided with links 6 which have their forward ends connected to an eye 7, said eye having connected thereto the rear end of a drag chain 8, the forward end of which is suitably connected to the wagon body 1.

Fixed to the inner runner 4 is a stud 9 which is pivotally connected to the lever 10, said lever having its rear end integrally connected to the brake rod 11, said rod being pointed as at 12 so as to more effectually dig into the ice or snow. The runner 4 is further provided with a guide 13 in which slidably engages the rod 11.

Pivotally connected to the forward end of the lever 10 is a link 14, said link having its upper end pivotally connected to the bell crank lever 15, said bell crank lever being also connected to the rear end of the rod 16, the forward end of which is pivotally connected to the hand lever 17 which is arranged in convenient reach of the driver.

When it is desired to apply the brake, it is only necessary to move the lever 17 forwardly, whereupon the bell crank lever 15 will be actuated to rock the lever 10, thus moving the rod 11 downwardly so that its pointed end will dig into the ice or snow.

What is claimed is:—

The combination with a wheeled vehicle, of a pair of runners, transverse rods having their ends connected to the runners to hold the same in spaced parallel relation, means for detachably connecting the runners to the body of the vehicle, said rods being arranged for engagement with the wheel of the vehicle at a point below the upper edges of the runners.

In testimony whereof, I affix my signature, in the presence of two witnesses.

ARTHUR R. ZIMMERMAN.

Witnesses:
GEO. W. JOHN,
NORMAN W. HENNINGER.

Copies of this patent may be obtained for five cents each, by addressing the "Commissioner of Patents, Washington, D. C."